(12) United States Patent
Fan et al.

(10) Patent No.: US 9,076,251 B2
(45) Date of Patent: Jul. 7, 2015

(54) COMPONENT SPECIFIC IMAGE MODIFICATION USING NATURAL LANGUAGE COLOR

(75) Inventors: Zhigang Fan, Webster, NY (US); Karen Marie Braun, Fairport, NY (US); Elizabeth Dubiel Wayman, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 286 days.

(21) Appl. No.: 12/850,238

(22) Filed: Aug. 4, 2010

(65) Prior Publication Data
US 2012/0032968 A1 Feb. 9, 2012

(51) Int. Cl.
*G06T 11/00* (2006.01)
*G06F 17/20* (2006.01)

(52) U.S. Cl.
CPC .............. *G06T 11/001* (2013.01); *G06F 17/20* (2013.01)

(58) Field of Classification Search
USPC .......................................................... 345/589
See application file for complete search history.

(56) References Cited

U.S. PATENT DOCUMENTS

| 6,983,068 | B2 | 1/2006 | Prabhakar et al. | |
|---|---|---|---|---|
| 2008/0007749 | A1* | 1/2008 | Woolfe | 358/1.9 |
| 2009/0128871 | A1* | 5/2009 | Patton et al. | 358/520 |
| 2010/0021069 | A1 | 1/2010 | Fan et al. | |

OTHER PUBLICATIONS

Shotton et al. "Textonboost for image understanding: Multi-class object recognition and segmentation by jointly modeling texture, layout, and context." International Journal of Computer Vision 81.1 (2009): 2-23.*

H. Cheng and Z. Fan, "Background Identification Based Segmentation and Multilayer Tree Based Representation of Document Images," Proc. IEEE Int'l. Conf. on Image Processing, ICIP, Rochester, NY, 4 pages (Sep. 2002).
B. Zafarifar and P.H.N. de With, "Blue Sky Detection for Picture Quality Enhancement," Advanced Concepts for Intelligent Vision Systems, vol. 4179, pp. 522-532 (2006).
B. Zafarifar and P.H.N. de With, "Grass Detection for Picture Quality Enhancement of TV Video," Advanced Concepts for Intelligent Vision Systems, vol. 4678, pp. 687-698 (2007).
A. Singhal, J. Luo and W. Zhu, "Probabilistic Spatial Context Models for Scene Content Understanding," Proc. IEEE Int'l Conference. Computer Vision and Pattern Recognition, 7 pages, 2003.
M.H. Yang, D.J. Kriegman and N. Ahuja, "Detecting Faces in Images: A Survey," IEEE Transactions on Pattern Analysis and Machine Intelligence (PAMI), pp. 34-58, vol. 24, No. 1, (Jan. 2002).
M.H. Yang, "Recent Advances in Face Detection," IEEE ICPR 2004 Tutorial, Cambridge, United Kingdom (Aug. 22, 2004).

* cited by examiner

*Primary Examiner* — Ulka Chauhan
*Assistant Examiner* — Schiller Hill
(74) *Attorney, Agent, or Firm* — Hoffmann & Baron, LLP

(57) ABSTRACT

Embodiments described herein include a component specific natural language color unit for modifying colors of image components in an image using component specific natural language commands. The CSNLC unit can receive a component specific natural language color command for a color modification of an input image. The component specific natural language color command can include a component identifier and a color modifier. The natural language command can be parsed to attribute the component identifier to an image component in the input image and to attribute the color modifier to a predefined color space associated with the image component. The color modifier can indicate the color modification to be performed. The color modification can be applied to the image component to adjust the color of the image component.

23 Claims, 4 Drawing Sheets

COMPONENT SPECIFIC IMAGE MODIFICATION USING NATURAL LANGUAGE COLOR

BACKGROUND

1. Technical Field

The presently disclosed embodiments are directed to modifying colors of image components separately and/or independently of each other using component specific natural language commands.

2. Brief Discussion of Related Art

Natural language processing can be used in computing environments to implement instructions. Recently, a form of natural language commands has been introduced for editing colors in an image. These natural language commands are referred to as Natural Language Color (NLC) commands. Using NLC commands, users may modify the color of an image. For example, a user may modify an image by entering the following commands: "Make yellow greener" or "Make blues lighter". Typically, the NLC commands do not distinguish between different components of an image when applying color modification and the system processing the NLC commands cannot identify and process component specific commands.

Using conventional approaches, the NLC commands are typically applied to the image so that color transformations are typically applied uniformly over the entire image. As one example, the command "Make yellow greener" typically modifies the image so that all yellow in the image is modified to be greener. Uniform color modification over an entire image may not be desirable in the cases where user wants to restrict color changes to only certain components of an image or certain types of components.

SUMMARY

According to aspects illustrated herein, there is provided a method for modifying color in an image using component specific natural language commands. The method includes receiving a component specific natural language color command for a color modification of an input image. The component specific natural language color command includes a component identifier and a color modifier. The method also includes parsing the component specific natural language command to attribute the component identifier to an image component in the input image and to attribute the color modifier to a predefined color space associated with the image component. The color modifier indicates the color modification to be performed. The method further includes applying the color modification to the image component to adjust the color of the image component.

According to other aspects illustrated herein, there is provided a non-transient computer readable storage medium storing instructions executable by a computing system including at least one computing device wherein execution of the instructions implements a method for modifying color in an image using component specific natural language commands. The method implemented by the execution of the instructions includes receiving a component specific natural language color command for a color modification of an input image. The component specific natural language color command includes a component identifier and a color modifier. The method implemented by the execution of the instructions also includes parsing the component specific natural language command to attribute the component identifier to an image component in the input image and to attribute the color modifier to a predefined color space associated with the image component. The color modifier indicates the color modification to be performed. The method implemented by the execution of the instructions further includes applying the color modification to the image component to adjust the color of the image component.

According to further aspects illustrated herein, there is provided a system for modifying color in an image using component specific natural language commands. The system includes a computing system having at least one computing device. The computing system is configured to receive a component specific natural language color command for a color modification of an input image. The component specific natural language color command includes a component identifier and a color modifier. The computing system is also configured to parse the component specific natural language command to attribute the component identifier to an image component in the input image and to attribute the color modifier to a predefined color space associated with the image component. The color modifier indicates the color modification to be performed. The computing system is further configured to apply the color modification to the image component to adjust the color of the image component.

DETAILED DESCRIPTION

Figure 1:
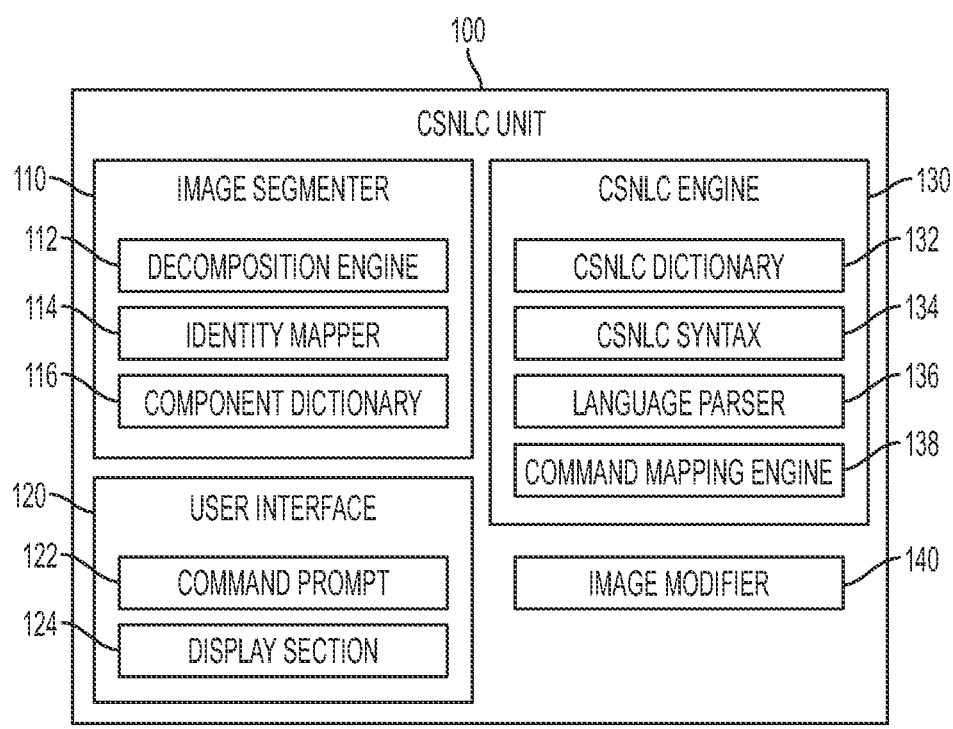
FIG. 1 depicts a block diagram of an exemplary component specific natural language color unit for modifying images using natural language commands.

Exemplary embodiments include a component specific natural language color (CSNLC) unit for modifying colors of image components using component specific natural language commands. A user can enter component specific natural language text-based commands to identify which objects should be affected by the requested changes. Embodiments of the CSNLC unit can segment an image into image components and receive natural language commands directed to the image components to modify the color of the image components separately and/or independently of each other. For example, the CSNLC unit enables a user to issue commands such as "Make black text darker". This is particularly helpful for non-color-experts in color manipulation, in that portions of an image (of the same color description) can be manipulated without affecting other portions.

As used herein, a "component specific natural language color command" or "CSNLC command" refers to a command for modifying a color of a particular image component in a segmented input image.

As used herein, an "image" refers to visual representation rendered by a display device, such as a picture, photograph, computer document including text, graphics, pictures, and/or photographs, and the like.

As used herein, "modify" or "adjust" refers to altering, changing, manipulating, and/or replacing, such as altering, changing, manipulating, and/or replacing a color in an image.

As used herein, a "color modification" refers to modifying a color in an image.

As used herein, a "color modifier" refers to a word or phrase in a CSNLC command that when processed results in a modification of a color in an image.

As used herein, an "image component" refers to a discrete segment of a segmented image having known boundaries and being associated with a "component identifier", which refers to a designation, description, name, term, or other identifier by which the image component is identified.

As used herein, "parsing" refers to dividing and/or separating a CSNLC command into syntactical units, such as a subject, a modifier, an image component or type, and the like.

As used herein, "attribute" refers to relating, associating, and/or connecting one thing to another. For example, attributing a component identifier to an image component and/or attributing a color modifier to a predefined color space.

As used herein, "color space" refers to a set of colors, which can include color elements and combinations of the color elements to form additional colors. Some examples of color spaces include a red-green-blue (RGB) color space, cyan-magenta-yellow-black (CMYK) color space, and the like.

As used herein, "applying" refers to putting something into action, use, and/or effect, such as applying a command to modify a color in an image to perform the color modification.

As used herein, "segmenting" refers to dividing, partitioning, and/or separating into segment or components, such as segmenting an image into image components.

As used herein, a "component specific natural language color unit" or "CSNLC unit" refers to a hardware and/or software implementation for modifying colors of image components in an image.

As used herein, an "image segmenter" refers to a tool for segmenting an image into image components.

As used herein, a "component specific natural language color engine" or "CSNLC engine" refers to a tool to process CSNLC commands by, for example, applying a syntax, parsing the command, and mapping the terms of the command.

As used herein, an "image modifier" refers to a tool for modifying an image based on a processed CSNLC command.

As used herein, "classifying" refers to arranging, organizing, and/or ordering one or more things based on one or more characteristics, parameters, and/or identifiers, such as classifying image components based component identifiers associated with the image components.

As used herein, a "component type" indicates a class to which a thing belongs, such as class to which an image component belongs.

As used herein, "command syntax" refers to a defined structure in which commands are specified to enable parsing and processing of the command.

FIG. 1 depicts a block diagram of a component specific natural color language (CSNLC) unit 100 that includes an image segmenter 110, a user interface 120, a component specific natural language color (CSNLC) engine 130, and an image modifier 150. The CSNLC unit 100 can perform color modification of images using CSNLC commands. The CSNLC unit 100 can segment an image to be modified into image components using an image segmenting process and can programmatically modify the color of the image components separately and independently of other image components in the image or in relation to the other image components in the image in response to CSNLC commands. The CSNLC unit 100 can receive a CSNLC command, attribute a portion of the command to a specific image component, and attribute a portion of the command to the color modification of the image component. The user interface 120 can be a graphical user interface (GUI) having a command prompt 122 in which a user can specify CSNLC commands and an image display section 124 in which the image to be modified can be displayed. The user interface 120 can receive natural language commands and other control commands and display input and modified images.

The CSNLC unit 100 can accept commands in CSNLC for specifying image components; component types, such as "text", "graphics", "picture", "background"; and the like. In some embodiments, the image components can be specified as phrases in component specific natural language sentences from a separate user interface item (e.g. a pull-down menu containing a list of the image components), by voice, and the like. During language parsing, the component information contained in the commands can be extracted and color modification can be applied to the image components and/or image component types specified.

In some embodiments, the CSNLC unit 100 can facilitate specifying an image component by a name corresponding to the image component. In these embodiments, certain types of image components, such as a face, sky and grass, and the like, can be automatically recognized and detected. For example, the command "Make the skin tones in the faces darker" could use a combination of face detection and the skin tone color detection to change only the faces in the image, while the color of the other "skin-tone" colored image components, such as rocks and/or sand, remain unchanged. Similarly, the command "Make the greens in the grass more vibrant" could use grass recognition and detection combined with green color detection to change only the grass in the image and leave the trees and other green image components unchanged.

The image segmenter 110 can segment an image into image components using one or more image segmentation processes. The image segmenter 110 can include an image decomposition engine 112, an identity mapper 114, and a component dictionary 116. The image segmenter 110 can classify the image components based on the content of the image components and can assign an identifier to each of the image components.

In some embodiments, the CSNLC unit 100 can receive an image that is already segmented. For example, some images can be created using a page description language such that components of an image are identified in the image file and/or a file associated with the image. In these embodiments, the CSNLC unit 100 can bypass the image segmenter 110 or can process the image using the image segmenter 110 to generate its own segmentation. When the previously segmented image is processed using the image segmenter 110, the image segmenter 110 can ignore the image component information and can segment the image using a segmentation process implemented by the image segmenter 110. Alternatively, the image segmenter 110 can use the image components identified in the image and can process the image to identify other image components or assign a CSNLC unit specific identifier to the image components correspond to a predetermined command.

The decomposition engine 112 can deconstruct an input image to segment the image into image components using a segmentation process. The segmentation process can identify image components based on boundaries analysis, object recognition, pattern recognition, and the like. As one example, the decomposition engine 112 can be configured to identify natural boundaries between image components based on, for example, color transitions, contrast, and the like. As another example, the decomposition engine 112 can recognize objects or patterns by comparing the objects or patterns to stored object and patterns, such as glyphs including text and other symbols. In some embodiments, the decomposition engine can use a combination of segmentation processes to segment the input image into image components.

In some embodiments, the segmentation process of the decomposition engine 112 can use background identification based segmentation, which can model an input image as a combination of background layers. To segment the input image into image components, the background identification segmentation can identify a main background and image components on the main background. The image components can be classified as text, pictures, or composite image components. A composite image component is an image component that is itself formed from image components. A composite image component can have a local background, which may overlay the main background and the segmentation process identifies the local background. Once the local background is identified, the segmentation process identifies the image component of the composite image component.

In some embodiments, the segmentation process of the decomposition engine can segment and classify an image into foreground/background, graphics/images and small/normal sized. The distinction between background and foreground image components can be made by evaluating data seams at image component boundaries, determining whether one object overlays another, and the like. The segmentation process can generate three bit maps.

As an example, when the image is a portable document format (PDF) file, a first bit map can be what normally results when an image is rendered and can have a width and height as indicated by values in the image description that control the page size. The dimensions of the first bit map (e.g., widths, heights, etc.) are determined by the image description and the resolution at which the page is rendered. The second bit map can indicate the order in which objects are painted (e.g., printed or rendered) in the image with respect to an image display list (e.g., a content stream). Image components appearing early in the display list may be painted over by succeeding image components in the display list. The third bitmap can indicate image component type for pixels in the first bit map, such as text, picture, graphics, and the like. From these three bitmaps, the boundaries between two touching image components can be identified and classified as real or imaginary, where image components that touch each other without a real boundary are merged into a single image component. Input image segmentation implemented using bit maps is described in more detail in copending U.S. Publication No. 2010/0021069, filed on Jul. 22, 2008, which is incorporated herein by reference in its entirety.

In some embodiments, the segmentation process of the decomposition engine can use object recognition algorithms to segment an image. For example, the decomposition engine 112 can scan the image to identify patterns, geometries, and/or other object characteristics. The object characteristics can be compared to stored object characteristics of known objects. Based on the comparison, the objects identified in the scan can be associated with the known objects, receive component identifiers, and can be classified into a component type.

The identity mapper 114 can assign component identifiers to each of the image components generated by the decomposition engine 112 and can classify the image components based on the content of the image components. In some embodiments, the component identifiers can be unique for each image component in the image. In some embodiments, component identifiers having the same type of content can be assigned an identical component identifier. The image components can be classified by type. For example, the image components can be classified as text, pictures, graphics, and the like. In some embodiments, a portion of the component identifier can reference the type of content included in the image component.

The CSNLC engine 130 can process component specific natural language commands entered in the user interface to facilitate color modification of image components in an image. The CSNLC engine 130 can include a component specific natural language color (CSNLC) dictionary 132, a component specific natural language color (CSNLC) syntax 134, a language parser 136, and a command mapping engine 138.

The CSNLC dictionary 132 can include words and/or phrases that can be recognized by the CSNLC engine 130. The words and/or phrases can include colors, color modifiers, common naming conventions of image components, for example, based on content types, and the like. For example, the CSNLC dictionary 132 can include terms, such as "red", "blue", "green", "text", "picture", "graphic", "sky", "skin", "grass", "background", and the like. The dictionary 132 can include synonyms and antonyms for terms so that when a user enters a command with a given term, the synonym of the term, or the antonym of the term is the term is associated with a negative modifier, such as "not", of the term can be used by the CSNLC engine 130.

Sometimes, it may be useful to use a multiplicity of color name dictionaries to cover the different types of vocabularies of users. In cases where multiple color dictionaries are used, each dictionary could be mapped independently onto color space regions or lexical mappings between the various dictionaries could be developed.

The CSNLC dictionary 132 can include color names, such as black, white, red, green, yellow, blue, brown, pink, orange, purple, gray, and the like. The NLC dictionary can also include compound color names, such as yellowish-green, green-blue, brownish-red, reddish-purple, and the like. There are also instances where such combinations are replaced by a new, single-word color name. For example, green-blue can be cyan or turquoise, greenish-brown can be olive, reddish-orange can be ochre, and greenish-yellow can be chartreuse. The CSNLC dictionary 132 can include color modifiers that can be used in conjunction with the fundamental and/or compound color names. These color modifiers include words such as, for example, light, dark, pale, deep, saturated, medium, dull, pastel, and the like. The color names, compound names, and color modifiers constitute the terms in one or more color dictionaries.

The color terms in the CSNLC dictionary 132 can correspond to regions of color space such that every region of color space corresponds to a color term. In some embodiments, there can be a direct mapping between finite regions (or subvolumes) of the color space and the color terms in the dictionary. Alternatively, the color terms could map to prototypical point locations in the color space (e.g., points in the color space may correspond to pure or ideal shades of cyan and magenta, navy blue and fire engine red, and the like). Those skilled in the art will recognize that other implementations for assigning regions of color space to the terms in a color dictionary can be used, such as, for example, using a statistical analysis of the results of psychophysical color naming studies.

In some embodiments, the CSNLC dictionary 132 can include command or instruction language terms to convey intents of color changes (differences and the quantitative color differences to which they correspond). For example, the dictionary 132 can include terms, such as darker, lighter, brighter, vibrant, mute, and the like.

The CSNLC syntax 134 can include rules for the formation of commands. The rules can define one or more command structures to be followed by a user when entering a natural language color command. For example, the CSNLC syntax 134 can require that a natural language command include a subject image component, color, and a subject modifier. The NLC syntax can facilitate efficient and accurate parsing of natural language commands. As one example, the user can enter the command "make black text darker", in which "text" is the subject image component, "black" is the color, and "darker" is the modifier. As another example, the syntax can be in the form of <magnitude><direction><property> with the following syntax, where the symbol ":" denotes "is defined as" and the symbol "|" denotes "or":

magnitude>: very-slightly|slightly somewhat|moderately significantly|strongly|very-strongly
direction>: more|less
property>: light|dark|colorful|saturated|contrasty|reddish brownish|yellowish|greenish|bluish|purplish|pinkish|orangeish|grayish The language parser 136 can parse the language of a component specific natural language command that is entered in the user interface based on the CSNLC dictionary 132 and NLC syntax 134. The language parser 136 can break the terms of the component specific natural language color command into distinct terms corresponding to color, image components, component types, and/or image modifiers. For example, the parser can compare the terms of the natural language color commands to the words and/or phrases in the CSNLC dictionary 132 and can identify dictionary entries that match the terms in the command.

The command mapping engine 138 can map the terms of the component specific natural language color commands identified by the language parser 136 to control parameters of color modification transforms applied in a quantitative color space. The command mapper 138 can map a component identifier in the command to an image component in the image and/or can map a color modifier in the command to a color in a color space. Any color space can be used for these transforms, but color spaces that are perceptually uniform and with dimensions that relate closely to the perceptual attributes (e.g., lightness, chroma, and hue) of the human visual system may be used for a simpler, more intuitive mapping process.

The image modifier 140 can modify the color of image components in the input image based on the component specific natural language color commands. The image modifier 140 can implement operations using the control parameters identified by the command mapping engine 138. For example, the image modifier 140 can select a color associated with the control parameter and can identify the boundaries of the image component for which the color is to be modified. To modify the color of the image component, the image modifier can replace the color with the selected color or can overlay the selected color on the image component.

Figure 2:
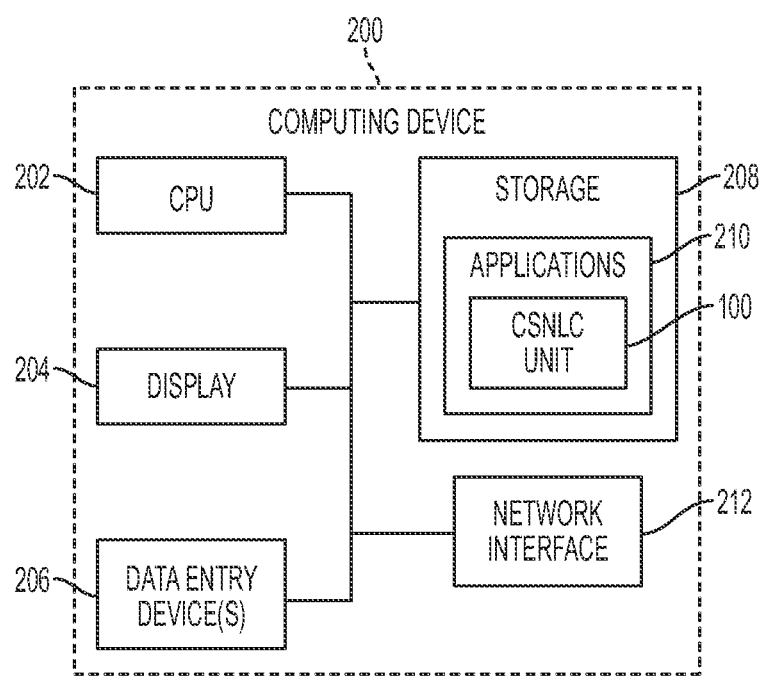
FIG. 2 depicts an exemplary computing device for implementing embodiments of the component specific natural language color unit.

FIG. 2 depicts an exemplary computing device 200 for implementing an embodiment of the CSNLC unit 100. The computing device 200 can be a mainframe; personal computer (PC); laptop computer; workstation; handheld device, such as a PDA and/or smart phone; and the like. In the illustrated embodiment, the computing device 200 includes a central processing unit (CPU) 202 and can include a display device 204. The display device 204 enables the computing device 200 to communicate with an operator through a visual display. The computing device 200 can further include data entry device(s) 206, such as a keyboard, touch screen, microphone, and/or mouse. The computing device 200 can include storage 208 for storing data and instructions. The storage 208 can include computer readable medium technologies, such as a floppy drive, hard drive, compact disc, tape drive, Flash drive, optical drive, read only memory (ROM), random access memory (RAM), and the like.

Applications 210, such as the CSNLC unit 100, or portions thereof, can be resident in the storage 208. The applications 210 can include instructions for implementing the CSNLC unit 100. The instructions can be implemented using, for example, C, C++, Java, JavaScript, Basic, Perl, Python, assembly language, machine code, and the like. The storage 208 can be local or remote to the computing device 200. The computing device 200 includes a network interface 212 for communicating with a network. The CPU 202 operates to run the applications 210 in storage 208 by executing instructions therein and storing data resulting from the performed instructions, which may be output via the display 204 or by other mechanisms known to those skilled in the art, such a print out from a printer.

Figure 3:
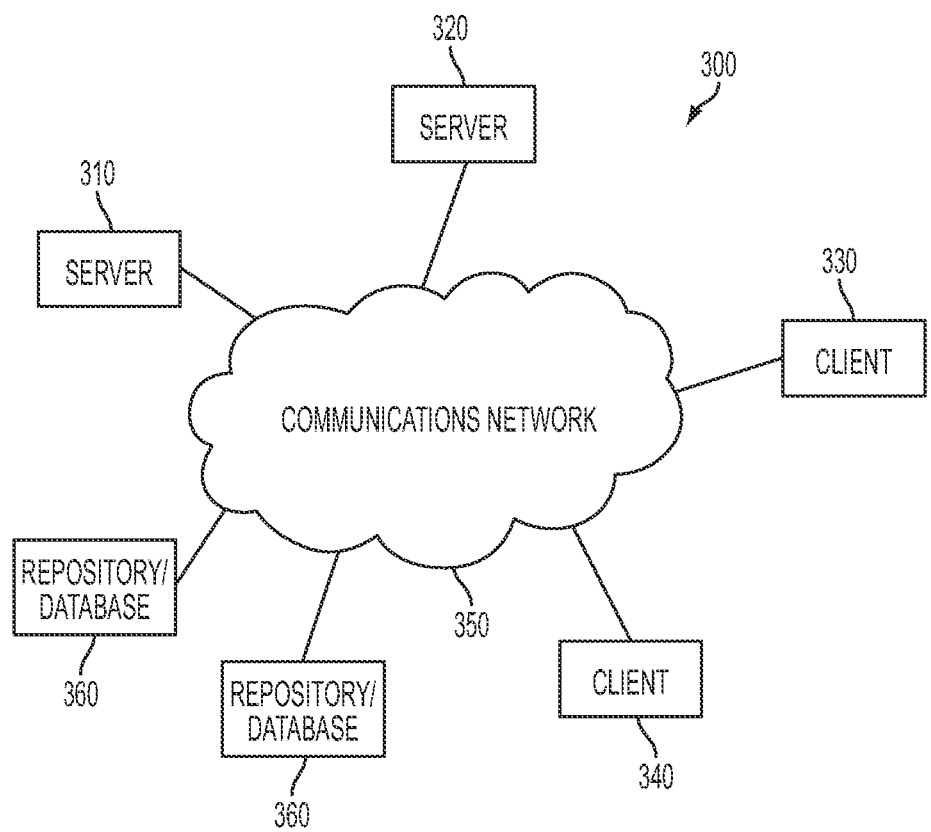
FIG. 3 depicts an exemplary computing system for implementing embodiments of the component specific natural language color unit in a networked environment.

FIG. 3 depicts an exemplary computing system 300 for implementing embodiments of the CSNLC unit 100. The computing system 300 includes one or more servers 310 and 320 coupled to clients 330 and 340, via a communication network 350, which can be any network over which information can be transmitted between devices communicatively coupled to the network. The system 300 can also include repositories or database devices 360, which can be coupled to the servers 310/320 and clients 330/340 via the communications network 350. The servers 310/320, clients 330/340, and database devices 360 can be implemented using a computing device, such as a computing device implemented in a similar manner as the computing device 200 of FIG. 2. In some embodiments, the CSNLC unit 100 can be implemented using a single computing device or can be implemented using multiple computing devices in a distributed manner.

The servers 310/320, clients 330/340, and/or databases 360 can store information, such as dictionary terms, input images, modified images, syntax, colors, and the like. In some embodiments, the CSNLC unit 100 can be distributed among the servers 310/320, clients 330/340, and database devices 360 such that one or more components of the CSNLC unit 100 and/or portion of one or more components of the CSNLC unit 100 can be implemented by a different device (e.g. clients, servers, databases) in the communication network 350. For example, the image segment 110 can be resident on the server 310, the user interface 120 can be resident on the client 330, the CSNLC engine 130 and image modifier 150 can be resident on the server 320.

Figure 4:
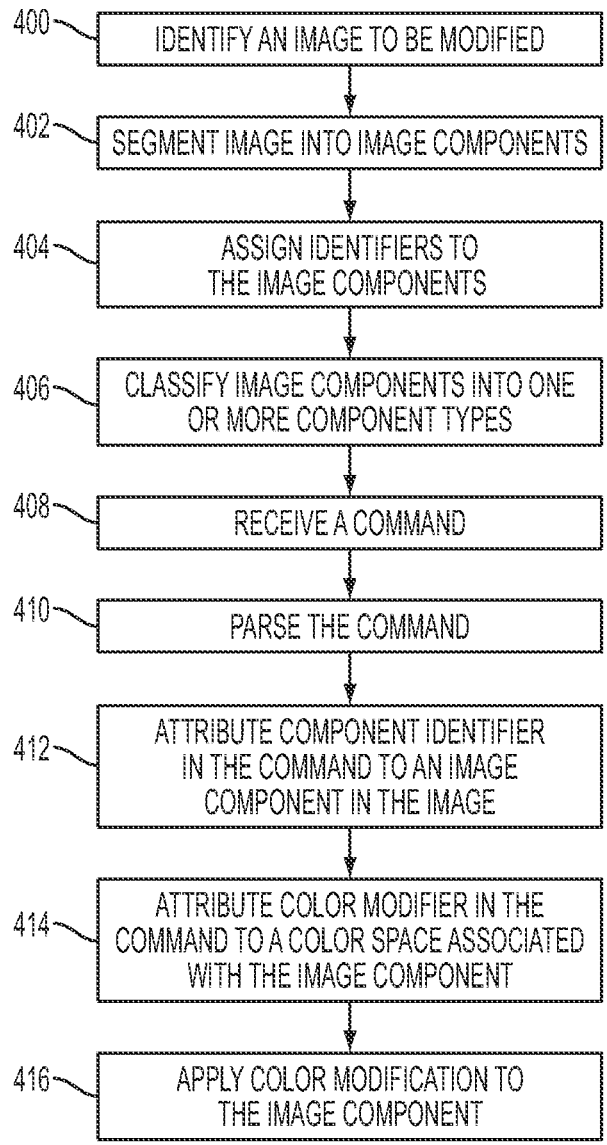
FIG. 4 is a flowchart illustrating an exemplary process of modifying colors of image components using natural language commands.

FIG. 4 is a flowchart illustrating an exemplary process of modifying colors of image components using natural language commands. The CSNLC unit can identify an image to be modified (400) and can segment the image into image components (402). The image can be segmented using one or more segmentation processes. For example, the image segmenter can segment the input image based on backgrounds, data seams, object recognition, and the like. The CSNLC unit can assign a component identifier to each of the image components (404) and can classify each of the image components into one or more component types (406).

A component specific natural language command can be received by the CSNLC unit (408) and the CSNLC unit can parse the component specific natural language command (410). The component specific natural language command can include a component identifier and a color modifier, and the CSNLC unit can attribute the component identifier to an image component in the image (412) and can attribute the color modifier to a color space associated with the image component (414).

To attribute the component identifier to the image component, the CSNLC unit can process the component identifier by comparing the component identifier to the component identities assigned to the image components and can return the image component having a component identity that matches the component identifier. Likewise the color modifier can be associated with a color space using the CSNLC dictionary to ascertain the color to be used for the color modification.

The CSNLC unit can apply the color modification to the image component (416). When the CSNLC applies the color modification to the image component, the other image components in the image remain unaffected. In this manner, a user can separately and independently modify image components in the image using component specific natural language commands without affecting other image components in the input image.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for modifying color in an image using component specific natural language color commands comprising:
    identifying an input image to be modified;
    segmenting the input image into a plurality of image components, the image components being discrete segments of the input image;
    assigning each of the plurality of image components a component identity based on content of the image component using pattern recognition, object recognition, and boundaries analysis;
    classifying the plurality of image components into a plurality of component types;
    receiving a component specific natural language color command for a color modification of the input image, the component specific natural language color command including a component type identifier and a color modifier;
    parsing the component specific natural language color command to obtain the component type identifier and the color modifier contained in the component specific natural language color command;
    identifying, without user input, the one or more component types corresponding to the parsed component type identifier;
    identifying all of the image components classified with each of the identified component types;
    attributing the color modifier to a predefined color space associated with each of the identified image components, the color modifier indicating the color modification to be performed; and
    applying the color modification to the identified image components to adjust the color of the identified image components.

2. The method of claim 1, wherein applying the color modification is performed without affecting the plurality of image components other than the identified at least one image component in the image.

3. The method of claim 1, further comprising:
    applying a command syntax to the component specific natural language color command.

4. The method of claim 3, wherein the command syntax comprises a subject image component, a color, and a subject modifier.

5. The method of claim 3, wherein the command syntax comprises a magnitude, a direction, and a color.

6. The method of claim 3, wherein the command syntax applied is retrieved from a dictionary of multiple dictionaries.

7. The method of claim 6, wherein the dictionary includes selectively one or more of the following color names: black, white, red, green, yellow, blue, brown, pink, orange, purple, and gray.

8. The method of claim 7, wherein the dictionary further includes compound color names.

9. The method of claim 8, wherein each compound color names are stored in the dictionary as a single-word color name.

10. The method of claim 7, wherein the dictionary further includes color modifiers for each color name.

11. The method of claim 7, wherein each color name in the dictionary corresponds with exactly one finite region of color space in the dictionary.

12. The method of claim 6, wherein each dictionary of the multiple dictionaries is mapped individually onto color space regions and each dictionary of the multiple dictionaries is associated with a user or group of users associated with a unique command syntax.

13. The method of claim 1, further comprising:
    mapping the component identifier in the component specific natural language color command to the identified at least one image component in the image; and
    mapping the color modifier to a color in the color space.

14. The method of claim 1, wherein assigning each of the plurality of image components a component identifier further includes identifying a main background, identifying at least one image component disposed on the main background, identifying a local background, identifying at least one image component disposed on the local background, identifying at least one graphic, identifying at least one image, and identifying text as selectively one of normal sized text and small sized text.

15. The method of claim 1, wherein the input image comprises a computer document.

16. The method of claim 1, wherein classifying the plurality of image components into a plurality of component types comprises identifying image components as selectively one of text, pictures, and graphics.

17. A non-transient computer readable storage medium storing instructions executable by a computing system including at least one computing device, wherein execution of the instructions implements a method for modifying color in an image using component specific natural language color commands comprising:
    identifying an input image to be modified;
    segmenting the input image into a plurality of image components, the image components being discrete segments of the input image;
    assigning each of the plurality of image components a component identity based on content of the image component using pattern recognition, object recognition, and boundaries analysis;

classifying the plurality of image components into a plurality of component types;

receiving a component specific natural language color command for a color modification of the input image, the component specific natural language color command including a component type identifier and a color modifier;

parsing the component specific natural language color command to obtain the component type identifier and the color modifier contained in the component specific natural language color command;

identifying, without user input, the one or more component types corresponding to the parsed component type identifier;

identifying all of the image components classified with each of the identified component types;

attributing the color modifier to a predefined color space associated with each of the identified image components, the color modifier indicating the color modification to be performed; and applying the color modification to the identified image components to adjust the color of the identified image components.

18. The medium of claim 17, wherein applying the color modification is performed without affecting the plurality of image components other than the identified at least one image component in the image.

19. The medium of claim 17, wherein the method implemented by the execution of the instructions further comprises:
applying a command syntax to the component specific natural language color command.

20. The medium of claim 17, wherein the method implemented by the execution of the instructions further comprises:
mapping the component identifier in the component specific natural language color command to the identified at least one image component in the image; and
mapping the color modifier to a color in the color space.

21. A system for modifying color in an image using component specific natural language color commands comprising:

a computing system including at least one computing device, the computing system configured to:

identify an input image to be modified;

segment the input image into a plurality of image components, the input components being discrete segments of the input image;

assign each of the plurality of image components a component identity based on content of the image component using pattern recognition, object recognition, and boundaries analysis;

classify the plurality of image components into a plurality of component types;

receive a component specific natural language color command for a color modification of an input image, the component specific natural language color command including a component type identifier and a color modifier;

parse the component specific natural language color command to obtain the component type identifier and the color modifier contained in the component specific natural language color command;

identify, without user input, the one or more component types corresponding to the parsed component type identifier;

identify all of the image components classified with each of the identified component types;

attribute the color modifier to a predefined color space associated with each of the identified image components, the color modifier indicating the color modification to be performed; and apply the color modification to the identified image components to adjust the color of the identified image components.

22. The system of claim 21, wherein the computing system is configured to apply the color modification without affecting the plurality of image components other than the identified at least one image component in the image.

23. The system of claim 21, wherein the computing system is configured to apply a command syntax to the component specific natural language color command.

* * * * *